United States Patent
Luo et al.

(10) Patent No.: US 11,402,894 B2
(45) Date of Patent: Aug. 2, 2022

(54) VR IMAGE SENDING METHOD AND APPARATUS

(71) Applicant: HUAWEI TECHNOLOGIES CO., LTD., Shenzhen (CN)

(72) Inventors: Yi Luo, Shenzhen (CN); Fangzhou Zheng, Nanning (CN); Yu Xu, Taipei (TW); Wenyi Qiu, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/495,858

(22) PCT Filed: Jul. 7, 2017

(86) PCT No.: PCT/CN2017/092285
§ 371 (c)(1),
(2) Date: Sep. 20, 2019

(87) PCT Pub. No.: WO2018/171084
PCT Pub. Date: Sep. 27, 2018

(65) Prior Publication Data
US 2020/0064907 A1  Feb. 27, 2020

(30) Foreign Application Priority Data
Mar. 22, 2017  (CN) .......................... 201710175242.8

(51) Int. Cl.
*G06F 3/01* (2006.01)
*G02B 27/00* (2006.01)
(Continued)

(52) U.S. Cl.
CPC .......... *G06F 3/011* (2013.01); *G02B 27/0093* (2013.01); *G02B 27/017* (2013.01);
(Continued)

(58) Field of Classification Search
CPC ...... G06F 3/011; G06F 3/04815; G06F 3/017; G06F 3/013; G06F 3/012; G06T 19/006;
(Continued)

(56) References Cited

U.S. PATENT DOCUMENTS

RE44,959 E    6/2014  Paulraj et al.
8,749,556 B2  6/2014  De Aguiar et al.
(Continued)

FOREIGN PATENT DOCUMENTS

CN    1707984 A    12/2005
CN    103248883 A   8/2013
(Continued)

OTHER PUBLICATIONS

Perritaz et al., "6th Sense—Toward a Generic Framework for End-to-End Adaptive Wearable Augmented Reality", International Conference on Financial Cryptography and Data Security, [Lecture Notes in Computer Science;Lect.Notes Computer], Springer, Human Machine Interaction, LNCS 5440, 2009, pp. 280-310, Berlin, Heidelberg, XP047393246, total 31 pages.
(Continued)

*Primary Examiner* — Nelson M Rosario
*Assistant Examiner* — Scott D Au
(74) *Attorney, Agent, or Firm* — Maier & Maier, PLLC

(57) ABSTRACT

A method and an apparatus for sending a VR image, to improve accuracy of an image compression ratio determined when a VR image is sent. The method includes: receiving, by a VR host, first motion information sent by a VR device, where the first motion information is used to indicate a current motion status of the VR device; determining, by the VR host, a first image compression ratio based on the motion information; compressing, by the VR host, a to-be-sent VR
(Continued)

image based on the first image compression ratio; and sending, by the VR host, the compressed VR image to the VR device.

18 Claims, 4 Drawing Sheets

(51) Int. Cl.
*G02B 27/01* (2006.01)
*G06T 19/00* (2011.01)
*G06T 19/20* (2011.01)
*G06V 20/20* (2022.01)

(52) U.S. Cl.
CPC ............ *G06F 3/017* (2013.01); *G06T 19/006* (2013.01); *G06T 19/20* (2013.01); *G06V 20/20* (2022.01); *A63F 2300/8082* (2013.01); *G02B 2027/014* (2013.01)

(58) Field of Classification Search
CPC .................. G06T 19/20; G02B 27/017; G02B 2027/014; G02B 27/0093; G06K 9/00671
See application file for complete search history.

(56) References Cited

U.S. PATENT DOCUMENTS

| | | | |
|---|---|---|---|
| 9,460,351 B2 | 10/2016 | Kim et al. | |
| 2003/0113022 A1* | 6/2003 | Hijiri | G06T 9/001 382/232 |
| 2013/0212216 A1 | 8/2013 | Mao et al. | |
| 2016/0378117 A1 | 12/2016 | Szatmary et al. | |
| 2016/0378177 A1 | 12/2016 | Wei | |
| 2017/0045941 A1 | 2/2017 | Tokubo et al. | |
| 2017/0075416 A1 | 3/2017 | Armstrong | |
| 2017/0287097 A1* | 10/2017 | Chen | G06T 19/006 |
| 2017/0316607 A1* | 11/2017 | Khalid | G02B 27/0172 |

FOREIGN PATENT DOCUMENTS

| | | |
|---|---|---|
| CN | 105117111 A | 12/2015 |
| CN | 106293043 A | 1/2017 |
| JP | 2016025531 A | 2/2016 |
| JP | 2016527536 A | 9/2016 |
| KR | 20140001167 A | 1/2014 |
| KR | 20160092136 A | 8/2016 |

OTHER PUBLICATIONS

Han et al., "Cross Layer Optimization for Scalable Video Multicast over 802.11 WLANs", Consumer Communications and Networking Conference, CCNC 2006, IEEE, 2006, pp. 838-843, XP010893294, total 6 pages.

Perritaz, Damien, et al. "6th Sense—Toward a Generic Framework for End-to-End Adaptive Wearable Augmented Reality." International Conference on Financial Cryptography and Data Security, Lecture Notes in Computer Science, Springer. 2009. LNCS 5440. pp. 280-310.

* cited by examiner

VR IMAGE SENDING METHOD AND APPARATUS

This application is a national stage of International application No. PCT/CN2017/092285, filed on Jul. 7, 2017, which claims priority to Chinese Patent Application No. 201710175242.8, filed on Mar. 22, 2017. Both of the aforementioned applications are hereby incorporated by reference in their entireties.

FIELD

This application relates to the field of VR technologies, and in particular, to a method and an apparatus for sending a VR image.

BACKGROUND

Virtual reality (VR) technology is a newly emerging multimedia technology in recent years. The VR technology is a computer simulation technology that can be used to create and experience a virtual world. A user usually wears a VR device to experience a VR scenario. The VR device uses a graphics system, an optical system, and a posture tracking system that are integrated, so that the user can obtain an interactive immersive experience.

At present, the processing capability of the VR device is limited, and the VR device may be unable to implement some large games or video applications. Therefore, at present, it is proposed in the industry that a processor used to perform massive computing is disposed on other devices such as a desktop computer, a mobile phone, or a game console. These devices are referred to as VR hosts. The VR host generates a VR image, and wirelessly sends the VR image to the VR device. The VR device is only used to receive the VR image sent by the VR host and display the VR image. This helps reduce the weight and size of the VR device and improves user experience. Therefore, current VR systems usually include a VR device and a VR host. The VR host is used to create a virtual world, and a user experiences the virtual world by wearing the VR device.

To present a richer virtual world, a large quantity of VR images are transmitted in the VR system; in other words, the volume of data is very large. Generally, a radio channel between the VR host and the VR device is required to have a transmission rate of 5 Gbps (gigabits per second) or more, but an existing commercial radio channel cannot meet this requirement. To resolve this problem, a method for compressing a VR image before transmission is proposed in the industry to reduce a volume of transmitted data, so as to meet the bandwidth requirement.

In the prior art, an image compression ratio used to compress a VR image is determined based on channel quality of a radio channel. For example, if current channel quality is relatively poor, a relatively large image compression ratio may be determined to reduce a volume of transmitted data. However, the image compression ratio determined in this manner is inaccurate. For example, a switching rate of a VR image displayed by the VR device is sometimes high and sometimes low. For a slow motion image or even a static VR image, a user usually is relatively picky about image quality. Therefore, in this case, to ensure the image quality, a relatively large image compression ratio cannot be used to compress the VR image. However, if the channel quality is always poor, the VR host always compresses the VR image by using a relatively large image compression ratio, and this eventually leads to poor image quality. It can be understood that the current manner of determining the image compression ratio is relatively low in accuracy.

SUMMARY

An embodiment provides a method and an apparatus for sending a VR image, to improve accuracy of an image compression ratio determined in a VR system.

According to a first aspect, a method for sending a VR image is provided. The method may be implemented by using a VR host in a VR system. The method includes: receiving, by the VR host, first motion information sent by a VR device, where the first motion information is used to indicate a motion status of the VR device; determining, by the VR host, an image compression ratio based on the first motion information, and compressing a to-be-sent VR image based on the first image compression ratio; and sending, by the VR host, the compressed VR image to the VR device.

The VR host determines the image compression ratio based on motion information of the VR device. For example, when a moving rate of the VR device is relatively low, that is, when a switching rate of a VR image displayed by the VR device is relatively low, a relatively small image compression ratio is determined to ensure quality of the VR image. When the moving rate of the VR device is relatively high, that is, the switching rate of the VR image displayed by the VR device is relatively high, a relatively large image compression ratio is determined to ensure coherence of the VR image. In this manner, accuracy of the determined image compression ratio is improved, and a requirement of a user can be better met.

In a possible embodiment, before the determining, by the VR host, a first image compression ratio based on the first motion information, the method further includes: detecting, by the VR host, current channel quality of a radio channel; and determining, based on a mapping relationship between channel quality of a radio channel and an image compression ratio, an image compression ratio corresponding to the detected channel quality. The determining, by the VR host, a first image compression ratio based on the first motion information includes: determining, by the VR host based on the first motion information, the image compression ratio corresponding to the detected channel quality as the first image compression ratio; or adjusting, by the VR host based on the first motion information, the image compression ratio corresponding to the detected channel quality, and using an adjusted image compression ratio as the first image compression ratio.

The VR host preliminarily determines an image compression ratio based on the current channel quality of the radio channel, and then the VR host decides, based on the first motion information, whether the preliminarily determined image compression ratio can be used as the first image compression ratio to compress the VR image. For example, when the VR device is in a stationary state, the VR host may directly determine the preliminarily determined image compression ratio as the first image compression ratio. When the VR device is in a moving state, the VR host may adjust the preliminarily determined image compression ratio based on the first motion information, and use an adjusted image compression ratio as the first image compression ratio. This embodiment may improve accuracy of the determined image compression ratio.

In a possible embodiment, the determining, by the VR host based on the first motion information, the image compression ratio corresponding to the detected channel quality as the first image compression ratio includes: determining, by the VR host, the image compression ratio corresponding to the detected channel quality as the first image compression ratio if it is determined, based on the first motion information and historical motion information of the VR device, that the VR device is in a stationary state in future first duration.

The channel quality of the radio channel between the VR device and the VR host is related to the motion information of the VR device to some extent. For example, when the moving rate of the VR device is relatively high, the channel quality is often unstable, and when the moving rate of the VR device is relatively low, the channel quality is relatively stable. Therefore, the VR host may predict the motion status of the VR device in the future first duration. If it is determined that the VR device is in a stationary state in the future first duration, that is, the channel quality of the radio channel between the VR device and the VR host is relatively stable, the VR host may directly determine the image compression ratio corresponding to the channel quality as the first image compression ratio. In this manner, accuracy of the determined image compression ratio is improved.

In a possible embodiment, the adjusting, by the VR host based on the first motion information, the image compression ratio corresponding to the detected channel quality includes: adjusting, by the VR host based on the first motion information, the image compression ratio corresponding to the detected channel quality if it is determined, based on the first motion information and historical motion information of the VR device, that the VR device is in a moving state in future first duration.

The VR host may predict the motion status of the VR device in the future first duration. If it is determined that the VR device is in a moving state in the future first duration, it is inaccurate for the VR host to directly use the image compression ratio corresponding to the detected channel quality as the first image compression ratio. Therefore, the VR host may adjust, based on the first motion information, the image compression ratio corresponding to the detected channel quality. In this manner, accuracy of the determined image compression ratio is improved.

In a possible embodiment, the adjusting, by the VR host based on the first motion information, the image compression ratio corresponding to the detected channel quality includes: reducing, by the VR host, the image compression ratio corresponding to the detected channel quality if the first motion information indicates that a moving rate of the VR device is less than or equal to a first rate; or increasing, by the VR host, the image compression ratio corresponding to the detected channel quality if the first motion information indicates that a moving rate of the VR device is greater than a second rate. The first rate is less than or equal to the second rate.

The VR host may adjust, based on the moving rate of the VR device, the image compression ratio corresponding to the detected channel quality. For example, when the moving rate of the VR device is relatively high, the VR host increases the image compression ratio corresponding to the detected channel quality, to ensure coherence of the VR image. When the moving rate of the VR device is relatively low, the VR host reduces the image compression ratio corresponding to the detected channel quality, to ensure quality of the VR image. In this manner, accuracy of the determined image compression ratio is improved.

In a possible embodiment, after the detecting, by the VR host, current channel quality of a radio channel, the method further includes: determining, by the VR host based on a mapping relationship between channel quality of a radio channel and a modulation and coding scheme (MCS), an MCS corresponding to the detected channel quality; and determining, by the VR host based on the first motion information, the MCS corresponding to the detected channel quality as a first MCS; or adjusting, by the VR host based on the first motion information, the MCS corresponding to the detected channel quality, and using an adjusted MCS as a first MCS. Before the sending, by the VR host, the compressed VR image to the VR device, the method further includes: performing, by the VR host, modulation and coding on the compressed VR image according to the first MCS. The sending, by the VR host, the compressed VR image to the VR device includes: sending, by the VR host, the compressed VR image on which modulation and coding has been performed to the VR device.

The VR host preliminarily determines an MCS based on the channel quality of the radio channel, and then the VR host decides, based on the first motion information, whether the preliminarily determined MCS can be used as the first MCS to perform modulation and coding on the compressed VR image. For example, when the VR device is in a stationary state, the VR host may directly determine the preliminarily determined MCS as the first MCS. When the VR device is in a moving state, the VR host may adjust the preliminarily determined MCS based on the first motion information, and use an adjusted MCS as the first MCS. Therefore, accuracy of the determined MCS is improved.

In a possible embodiment, the determining, by the VR host based on the first motion information, the MCS corresponding to the detected channel quality as a first MCS includes: determining, by the VR host, the MCS corresponding to the detected channel quality as the first MCS if it is determined, based on the first motion information and the historical motion information of the VR device, that the VR device is in a stationary state in the future first duration.

The channel quality of the radio channel between the VR device and the VR host is related to the motion information of the VR device to some extent. For example, when the moving rate of the VR device is relatively high, the channel quality is often unstable, and when the moving rate of the VR device is relatively low, the channel quality is relatively stable. Therefore, the VR host may predict the motion status of the VR device in a future first duration. If it is determined that the VR device is in a stationary state in the future first duration, that is, the channel quality of the radio channel between the VR device and the VR host is relatively stable, the VR host may directly determine the MCS corresponding to the detected channel quality as the first MCS. In this manner, accuracy of the determined MCS is improved.

In a possible embodiment, the adjusting, by the VR host based on the first motion information, the MCS corresponding to the detected channel quality includes: adjusting, by the VR host based on the first motion information, the MCS corresponding to the detected channel quality if it is determined, based on the first motion information and the historical motion information of the VR device, that the VR device is in a moving state in the future first duration.

The VR host may predict the motion status of the VR device in the future first duration. If it is determined that the VR device is in a moving state in the future first duration, it is inaccurate for the VR host to directly use the MCS corresponding to the detected channel quality as the first MCS. Therefore, the VR host adjusts, based on the first motion information, the MCS corresponding to the detected channel quality. In this manner, accuracy of the determined MCS is improved.

In a possible embodiment, the adjusting, by the VR host based on the first motion information, the MCS corresponding to the detected channel quality includes: adjusting, by the VR host, the MCS corresponding to the detected channel quality to a second MCS if the first motion information indicates that the moving rate of the VR device is less than or equal to a first rate, where a modulation and coding rate of the second MCS is greater than a modulation and coding rate of the MCS corresponding to the detected channel quality; or adjusting, by the VR host, the MCS corresponding to the detected channel quality to a third MCS if the first motion information indicates that the moving rate of the VR device is greater than a second rate, where a modulation and coding rate of the third MCS is less than a modulation and coding rate of the MCS corresponding to the detected channel quality, and the first rate is less than the second rate.

The VR host may adjust, based on the moving rate of the VR device, the MCS corresponding to the detected channel quality. For example, when the moving rate of the VR device is relatively high, the VR host determines a MCS with a relatively low modulation and coding rate to ensure coherence of the VR image. When the moving rate of the VR device is relatively low, the VR host determines a MCS with a relatively high modulation and coding rate to ensure quality of the VR image. In this manner, accuracy of the determined MCS is improved.

In a possible embodiment, the first motion information is used to indicate current location information of the VR device, and the detecting, by the VR host, current channel quality of a radio channel includes: determining, by the VR host within a range of a first angle based on the location information, a first wireless transmission direction from at least one wireless transmission direction that is generated by the VR device and distributed in a 360-degree range, where the first angle is greater than 0 degrees and less than 360 degrees; and detecting, by the VR host, current channel quality of a radio channel in the first wireless transmission direction.

The VR host may determine, within a range of a relatively small angle based on the location information of the VR device, the first wireless transmission direction from at least one wireless transmission direction; and the radio channel in the wireless transmission direction is a communication channel between the VR host and the VR device. In this manner, the VR host does not need to search for a wireless transmission direction in a 360-degree range, thereby improving transmission efficiency of the VR image.

In a possible embodiment, the first motion information includes one or more of velocity information, acceleration information, angular velocity information, and angular acceleration information of the VR device.

The first motion information may be other information, and the foregoing types of information are merely examples. This is not specifically limited in this embodiment.

According to a second aspect, an apparatus for sending a VR image may be provided. The apparatus for sending a VR image has functions of implementing the VR host in the foregoing method design. These functions may be implemented by hardware or may be implemented by hardware executing corresponding software. The hardware or the software includes one or more units corresponding to the functions.

In a possible embodiment, an exemplary structure of the apparatus for sending a VR image may include a receiving unit, a processing unit, and a sending unit. These units may perform corresponding functions in the method provided in the first aspect or any possible design of the first aspect.

According to a third aspect, an embodiment further provides an apparatus for sending a VR image. The apparatus for sending a VR image has functions of implementing the VR host in the foregoing method design. These functions may be implemented by hardware. The apparatus for sending a VR image includes a memory, a transceiver, and a processor. The memory is configured to store computer executable program code, and the processor is coupled to the memory and the transceiver. The program code stored in the memory includes an instruction, and when the processor executes the instruction, the instruction enables the apparatus for sending a VR image to perform the method performed by the VR host in the first aspect or any possible design of the first aspect.

According to a fourth aspect, an embodiment further provides a computer-readable storage medium, where the computer-readable storage medium stores an instruction, and when the instruction runs on a computer, the computer is enabled to perform the method for sending a VR image in the first aspect.

According to a fifth aspect, a computer program product including an instruction is provided. When the computer program product runs on a computer, the computer is enabled to perform the method for sending a VR image in the first aspect.

DESCRIPTION OF EMBODIMENTS

Figure 1:
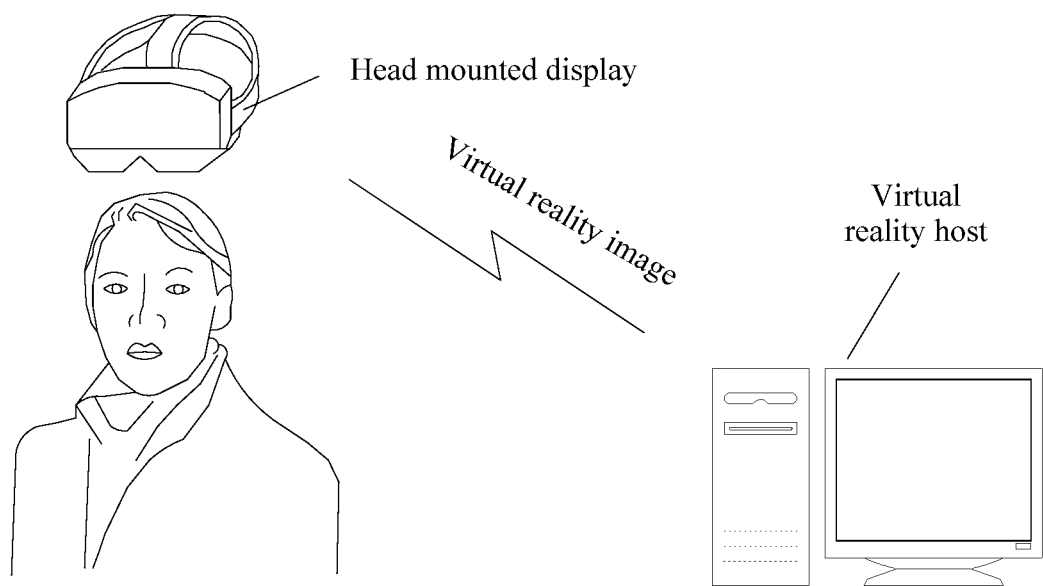
FIG. 1 is an architectural diagram of a VR system.

The following clearly and completely describes the technical solutions with reference to the accompanying drawings.

An example in which a VR system includes a VR host and a VR device is used for description. The following terms are defined:

(1) A VR host is an important device in a VR system, and is configured to generate a VR image, or obtain a VR image locally, from another electronic device, or a cloud, and send the VR image to a VR device. The VR host may be an electronic device such as a television set, a notebook computer, or a smartphone. The VR host may also be referred to as a VR host, or the like.

(2) A VR image may be a three-dimensional image. For example, the VR image is generated by a VR host based on a geometric model or is converted from a solid model in a two-dimensional image.

(3) A VR device includes a VR display. For example, the VR device is a head mounted display (HMD). When a user wears the HMD, the VR display is disposed in front of eyes of the user. The VR display generally includes left and right glasses that are separated independently, so that information obtained by the left and right eyes of a person is different. For example, different images for the left and right eyes are separately displayed on a left eye screen and a right eye screen. After human eyes obtain the information with differences, a stereo perception is generated in the mind.

(4) A beam is a communication resource. The beam may be a wide beam, a narrow beam, or a beam of another type. Different beams may be considered as different communication resources. The same information or different information may be sent by using different beams. A beamforming technology (beamforming) forms a beam in a specified direction when a radio signal is sent by using a number of antennas, to obtain a relatively large signal gain in an expected direction, so as to reduce power consumption and ensure signal quality. Generally, transmit beams generated by a transmitting end may be distributed in different directions of 360 degrees in space, and receive beams generated by a receiving end may also be distributed in different directions of 360 degrees in space. Beam training may be a process of beam alignment between the transmit beams generated by the transmitting end and the receive beams generated by the receiving end, an optimal transmit-receive beam is determined from the beam training, and the optimal transmit-receive beam is a radio channel between the transmitting end and the receiving end.

The "beam" may also be referred to as a "transmission resource" or the like. That is, the name of the "beam" is not limited herein, as long as the foregoing concept is expressed.

(5) In addition, the term "and/or" in this specification describes only an association relationship for describing associated objects and represents that three relationships may exist. For example, an element or embodiment A and/or element or embodiment B may represent the following three cases: only element or embodiment A exists, both element or embodiment A and element or embodiment B exist, and only element or embodiment B exists. In addition, the character "/" in this specification generally indicates an "or" relationship between the associated objects, if without special explanation. Moreover, in the description of this application, the words such as "first" and "second" are merely used for differentiated description, and should not be understood as an indication or implication of relative importance, or as an indication or implication of an order.

To better describe a method for sending a VR image, the following first describes an application scenario of this application, namely, a system architecture of a VR system. Referring now to FIG. 1, FIG. 1 shows a VR system which includes a VR host and a VR device, where an example of the VR device is an HMD. The VR host generates a VR image, and then the VR host sends the generated VR image to the HMD. After receiving the VR image, the HMD displays the VR image. Therefore, a user wearing the HMD can view the VR image.

Presently, the VR host usually transmits the VR image to the VR device through a radio channel, but the volume of data of the VR image that needs to be transmitted is very large. For example, a VR video has a picture size of 1000×1000 pixels, a 24-bit true color, a rate of 30 frames per second, and duration of 2 hours. If no compression is performed, a space of 648 GB (gigabytes) (1000*1000*24*30*60*120=5.184×1012 bit≈648 GB) is required for storing this video. For example, if a bandwidth of the radio channel is 4 Mbps (megabits per second), a minimum time required for transmitting the VR video is 360 hours, namely, 15 days. It may be contemplated that due to a limitation of the bandwidth of the radio channel and impact of a large amount of data, the VR image needs to be compressed to reduce the volume of transmitted data and improve transmission efficiency.

If the VR image needs to be compressed, the VR host needs to determine an image compression ratio. The following describes a manner of determining the image compression ratio in the current VR system.

At present, the VR host determines the image compression ratio based on channel quality of the radio channel. The VR host detects current channel quality of the radio channel. For example, if the current channel quality is poor, a relatively large image compression ratio is determined to reduce the volume of transmitted data.

However, the image compression ratio determined in this manner is inaccurate. For example, a switching rate of the VR image is sometimes high and sometimes low, that is, content changes sometimes quickly and sometimes slowly. For a slow motion image or even a static VR image, a user usually is relatively picky about image quality. Therefore, in this case, to ensure the image quality, a relatively large image compression ratio cannot be used to compress the VR image. However, if the channel quality is always poor, the VR host always compresses the VR image by using a relatively large image compression ratio, and this eventually leads to poor image quality. It can be understood by a person of ordinary skill in the art that the current manner of determining the image compression ratio is not accurate.

To resolve the technical problem, this application provides a method for sending a VR image. That is, a VR host determines an image compression ratio based on motion information of a VR device. In the method, accuracy of a determined image compression ratio is improved. For details, refer to FIG. 2, which is a flowchart of a method for sending a VR image according to this application. In the following description process, the VR architecture shown in FIG. 1 is used as an example for which the method is applied to. Therefore, FIG. 2 may also be understood as a schematic diagram of information exchange between the VR host and the HMD in the VR architecture shown in FIG. 1. A procedure of the method is described as follows.

In step S201, motion information of the VR device is detected. The motion information is used to indicate a current motion status of the VR device.

Figure 2:
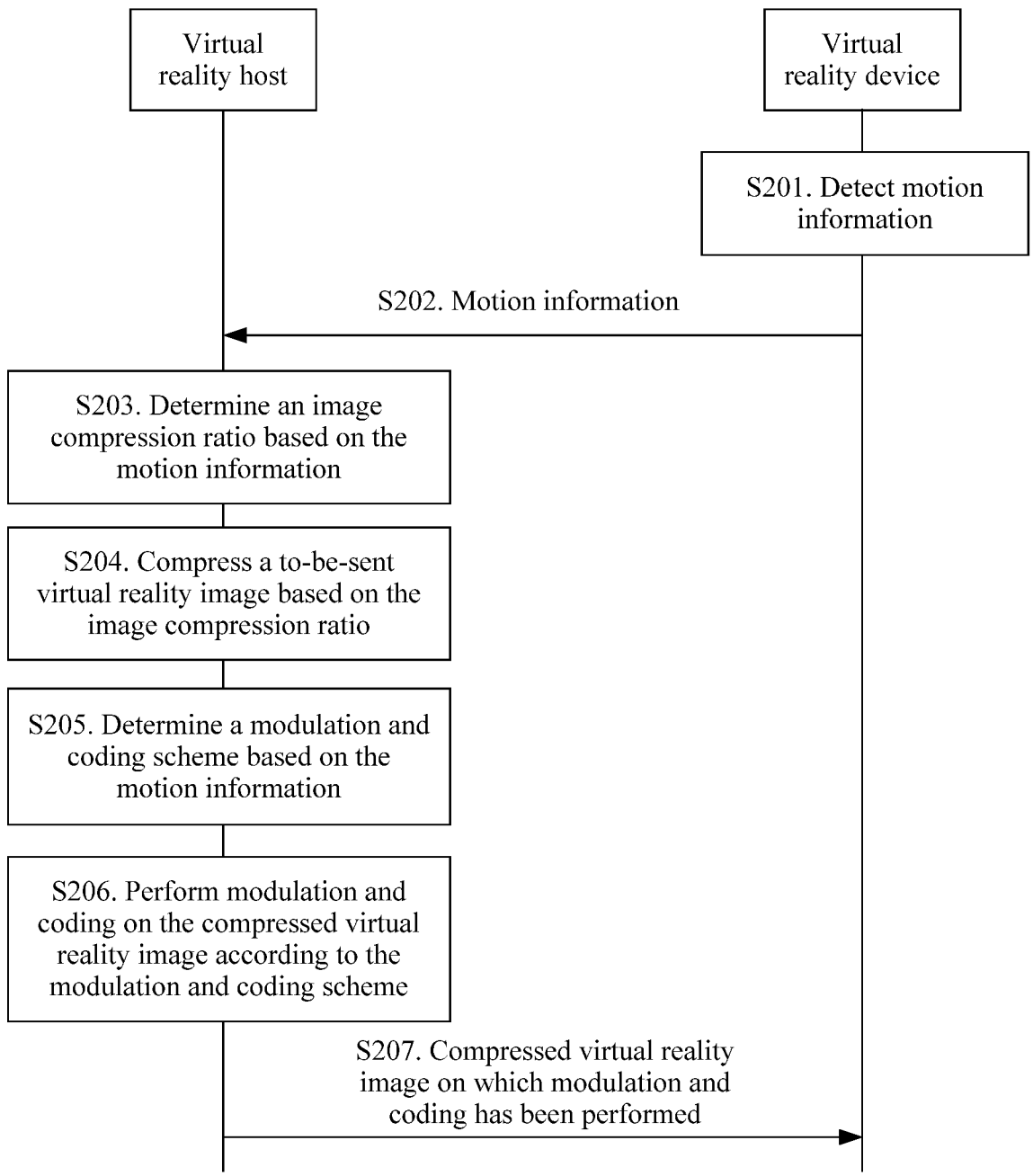
FIG. 2 is a flowchart of a method for sending a VR image.

Step S201 may be completed by the VR device or may be completed by the VR host. If step S201 is completed by the VR device, a motion sensor such as a gyroscope and an accelerometer may be disposed on the VR device to detect the motion information. If step S201 is completed by the VR host, a camera or another optical sensor may be disposed on the VR host, and a location, motion, movement, or rate of moving, motion, or movement, and size of the VR device within a unit time is detected by using the camera or the optical sensor, so as to determine the motion information of the VR device. Certainly, there may be another detection manner. This is not specifically limited to this embodiment. In FIG. 2, detecting the motion information using the VR device is used as an example. The following description will continue to use detecting the motion information by the VR device as an example.

The motion information may include one or more of location information, velocity information, acceleration information, angular velocity information, and angular acceleration information of the VR device. The VR device may detect the motion information periodically or in real time. To reduce burden, the VR device may alternatively detect the motion information only after receiving a motion information detection request sent by the VR host, and does not detect the motion information without receiving the request. For example, when a VR application is just started, the VR host may send a motion information detection request to the VR host, and the VR device detects the motion information after receiving the request. Alternatively, in a process in which a user experiences a VR application, the VR host may send a motion information detection request to the VR device every time before an image compression ratio is determined, and the VR device detects the motion information after receiving the request.

In step S202, the VR device sends the motion information to the VR host, and correspondingly, the VR host receives the motion information.

As mentioned above, the VR device may detect the motion information periodically or in real time, or may detect the motion information after receiving a motion information detection request sent by the VR host. Then, if the VR device detects the motion information after receiving the motion information detection request sent by the VR host, the VR device may send the motion information to the VR host after detecting the motion information. If the VR device detects the motion information periodically or in real time, the VR device may send the motion information to the VR host after detecting the motion information every time, or may send, to the VR host, latest detected motion information or all motion information detected in a latest time period after receiving the motion information detection request sent by the VR host.

While sending the motion information, the VR device may send information such as information about a time for generating the motion information by the VR device and a device identifier of the VR device. For example, in a multi-person VR interactive game, a number of users experience the same virtual game while wearing separate respective HMDs. In this case, generally, one VR host needs to communicate with a number of HMDs, that is, the VR host needs to send a VR image to the HMDs, and the VR host may also receive motion information sent by the HMDs. While sending its own motion information, each HMD may send a device identifier of the HMD that generates the motion information, so that the VR host can identify which HMD among the group of HMDs sends the received motion information. For another example, the VR host may receive a number of pieces of motion information sent by a same HMD. Therefore, while sending its own motion information, each HMD may send information about a time for generating the motion information by the HMD, so that the VR host can identify a generation time of each piece of motion information among the number of pieces of motion information.

In an exemplary embodiment, the VR host communicates with only one VR device. If the VR device further sends information about a time for generating motion information while sending the motion information, the VR host may correspondingly store the motion information and the information about the time after receiving the motion information and the information about the time. If the VR host receives a number of pieces of motion information, and each piece of motion information has a different generation time, when the VR host needs to use motion information, the VR host may select motion information of a latest time from the number of pieces of motion information, or may obtain an average value of all motion information in a period of time, and use the average value as required motion information. For example, the VR host receives three pieces of motion information sent by the VR device: a rate of 3 meters per second (m/s), a rate of 4 m/s, and a rate of 3 m/s respectively, and simultaneously receives information about times for generating the three pieces of motion information: a time point of 00:10, a time point of 00:15, and a time point of 00:20 respectively. When the VR host needs to use motion information, the VR host may directly select motion information of a latest time, that is, a moving rate of the VR device at 00:20 is 3 m/s, or the VR host may obtain an average value of motion information in a period of time such as duration from 00:15 to 00:20, that is, obtain an average value of 3 m/s and 4 m/s (3.5 m/s), and the VR host determines 3.5 m/s as required motion information. The period of time mentioned herein may be determined based on an actual situation and is not limited in this embodiment.

In step S203, the VR host determines an image compression ratio based on the motion information.

A possible implementation of step S203 is as follows: the VR host preliminarily determines an image compression ratio based on channel quality of a radio channel first, and then determines a final image compression ratio based on the motion information and the preliminarily determined image compression ratio. In this manner, two different factors, namely the channel quality and the motion information, are comprehensively considered, so that the determined image compression ratio is more accurate. The following describes an exemplary implementation process of this manner.

Where the VR host determines the final image compression ratio may be completed by three sub-steps. In the first sub-step, a radio channel between the VR host and the VR device is determined. In the second sub-step, an image compression ratio is preliminarily determined based on channel quality of the radio channel. In the third sub-step, a final image compression ratio is determined based on the motion information and the preliminarily determined image compression ratio.

The current VR system may be classified into two types: the first type is a VR system that performs data transmission using beamforming technology, such as a VR system that implements data transmission by using a high-frequency-band (for example, 60 GHz) communication mode. The second type is a VR system that performs data transmission without using beamforming technology, such as a VR system that implements data transmission by using a low-frequency-band (for example, 30 GHz) communications technology.

For the VR system of the first type, a radio channel between the VR host and the VR device may vary. The VR host and the VR device may perform beam training before communication is established. The VR host in the current VR system does not know a location of the VR device. Therefore, the beam training between the VR host and the VR device requires separate searching within a 360-degree range, that is, a process of alignment between transmit beams (distributed at different angles within 360 degrees) generated by the VR host and receive beams (distributed at different angles within 360 degrees) generated by the VR device is required, and a transmit-receive beam formed after the alignment is the radio channel between the VR host and the VR device. It can be understood that the beam training between the VR host and the VR device in the current VR system of the first type takes a relatively long time, and consequently, an image transmission delay is excessively large.

Generally, a location of the VR host is relatively fixed. Therefore, the VR host may determine, within a range of a first angle based on location information of the VR device, an optimal wireless transmission direction from at least one wireless transmission direction that is generated by the VR device and is distributed in a 360-degree range. Only channel quality of a radio channel in the optimal wireless transmission direction needs to be detected, and a delay brought by beam training is shortened without searching in the 360-degree range.

The range of the first angle may be determined based on a moving distance between location information of the VR device at a current moment and location information of the VR device at a previous moment; or location information of the VR device at a next moment may be predicted based on historical location information and current location information of the VR device, and the range of the first angle is determined based on a moving distance between the predicted location information of the VR device at the next moment and the location information of the VR device at the current moment.

Figure 3:
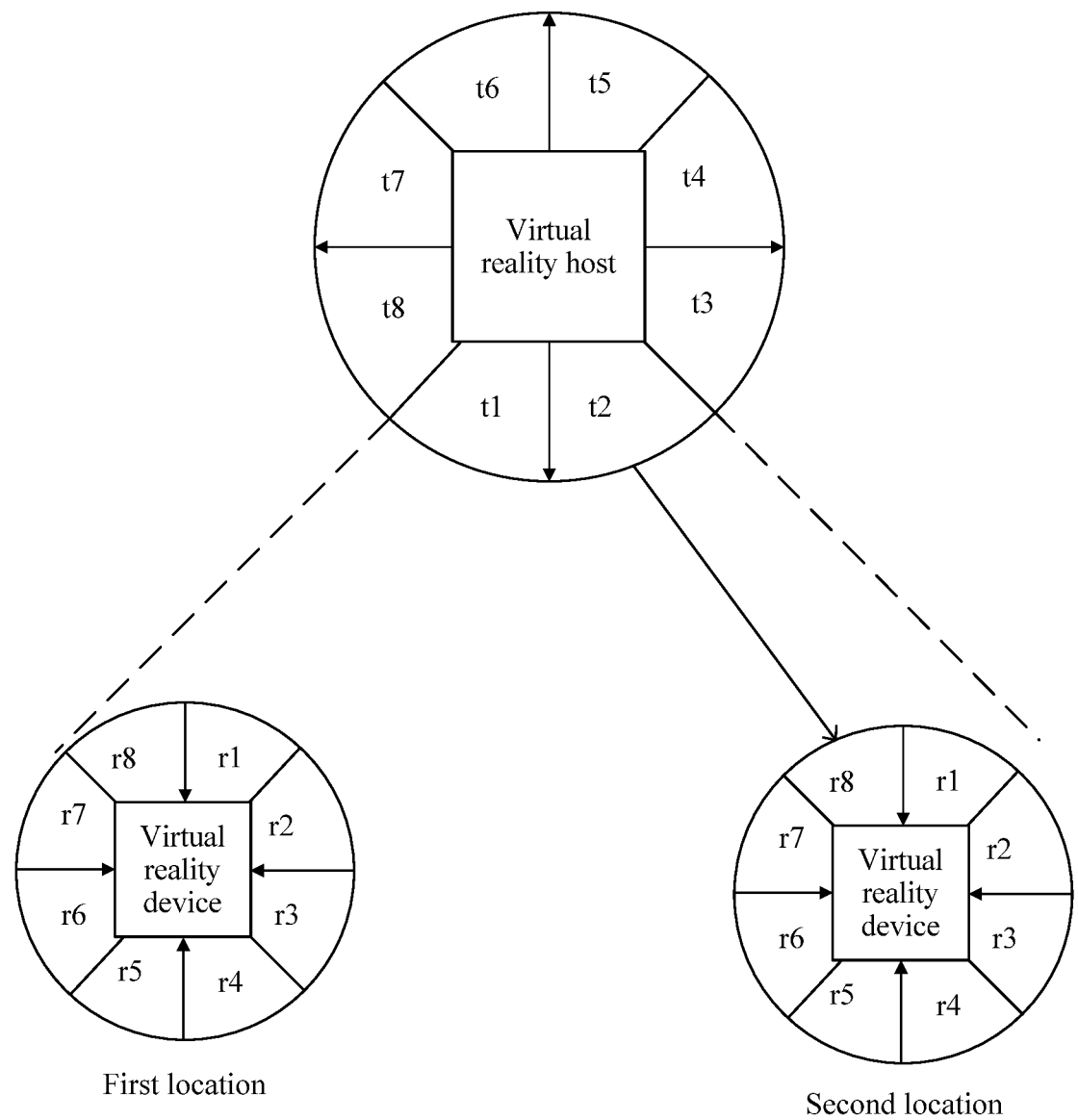
FIG. 3 is a schematic diagram of beamforming of a VR host and a VR device.

For example, referring now to FIG. 3, transmit beams generated by the VR host are in eight directions in a 360-degree range. As shown in FIG. 3, the VR device moves from a first location to a second location, and a moving distance, namely, a moving range between the first location and the second location is between two directions, namely, a direction t1 and a direction t2, of the transmit beams generated by the VR host. In this case, the VR host only needs to search between the direction t1 and the direction t2 for a receive beam generated by the VR device. For example, a search result is that an optimal radio channel determined by the VR host is a transmit-receive beam (t2, r8).

For the VR system of the second type, because the beamforming technology is not used by the VR system of this type, searching in a beamforming direction is not needed. The radio channel between the VR host and the VR device in the VR system of this type is usually preset, so that the VR host can directly perform the second sub-step of step S203.

After determining the radio channel, the VR host enters the second sub-step, namely, the VR host preliminarily determines an image compression ratio based on channel quality of the radio channel. In the second sub-step, the VR host needs to detect the channel quality of the radio channel There may be a number of exemplary implementations. For example, the VR host detects the channel quality in real time or periodically, and the VR host may store the detected channel quality. In this case, the VR host may determine, from the stored channel quality, channel quality that is most recently detected. The VR host does not need to detect the channel quality again, which helps improve efficiency. Alternatively, the VR host may directly detect current channel quality, so that the determined channel quality is more accurate. Then, the VR host preliminarily determines an image compression ratio based on a pre-stored mapping relationship between channel quality and an image compression ratio. There are a number of types of mapping relationships between channel quality of a radio channel and an image compression ratio. Table 1 is an example. In Table 1, a transmission rate of the radio channel is used as an example to show the channel quality of the radio channel

TABLE 1

| Transmission rate of a radio channel | Image compression ratio |
|---|---|
| 5 Gbps | 2:1 |
| 4 Gbps | 4:1 |
| 3 Gbps | 6:1 |
| 2 Gbps | 8:1 |

For example, if the transmission rate, determined by the VR host, of the radio channel is 4 Gbps, it can be preliminarily determined, according to Table 1, that the image compression ratio is 4:1.

Referring back to exemplary FIG. 2, the following describes an implementation process of the third sub-step of step S203, that is, the VR host determines the final image compression ratio based on the motion information and the preliminarily determined image compression ratio. To improve accuracy of the determined image compression ratio, the VR host may first predict a motion status of the VR device in future first duration based on the received motion information. A reason why the VR host predicts the motion status of the VR device in the future first duration will be described later. Then, the VR host determines the final image compression ratio based on the predicted motion status of the VR device in the future first duration and the preliminarily determined image compression ratio. In addition, the motion status of the VR device may be generally classified into two cases, namely, a stationary state or a moving state. Therefore, the implementation process of the third sub-step is further divided into two cases: In the first case, when the VR device is in a stationary state in the future first duration, the VR host determines the final image compression ratio. In the second case, when the VR device is in a moving state in the future first duration, the VR host determines the final image compression ratio.

Before the two cases are described, the reason why the VR host predicts the motion status of the VR device in the future first duration and an implementation are described first. Details are as follows below.

In a process in which a user wears the VR device to experience a virtual world, a motion status of the user changes over time, that is, the motion status of the VR device changes over time. For example, if the VR device detects that a current state is a stationary state, that is, a rate is 0 m/s, a process from sending, by the VR device, the motion information, namely, the rate of 0 m/s to the VR host to receiving, by the VR device, a compressed VR image sent by the VR host may require a specific duration. After the duration, the VR device may have changed from the stationary state to a moving state. Therefore, to improve accuracy of the determined image compression ratio, the VR host may predict the motion status of the VR device in the future first duration.

For example, the VR host receives, at 00:10, motion information and information about a time for generating the motion information by the VR device that are sent by the VR device, and a rate of the VR device at 00:08 is 0 m/s. In this case, the VR host can only determine that the VR device is stationary at 00:08. If a process in which the VR host compresses a VR image and sends the compressed VR image to the VR device needs 5 seconds, the VR device receives the compressed VR image at 00:15, but the VR device may have changed from a stationary state to a moving state at 00:15. Therefore, to improve accuracy of the image compression ratio, the VR host may predict the motion status of the VR device in the first duration, for example, 5 s in the future based on the received motion information.

The first duration may be determined based on experience or may be determined through calculation. If the first duration is determined through calculation, it may be understood, from the foregoing reasons why the VR host predicts the motion status of the VR device in the future first duration, that the first duration may be duration required by the VR device from a moment for generating motion information to a moment for receiving the compressed VR image sent by the VR host. The duration may be a sum of three time periods. The first time period may be the time required by the VR device to send the motion information to the VR host. The second time period may be the time required by the VR host to compress the VR image, and the third time period may be the time required by the VR host to send the compressed VR image to the VR device. The following describes calculation manners of the three time periods separately. The first time period may be a time difference between the time motion information is received by the VR host and the time the motion information is generated by the VR device. The second time period may be obtained by multiplying the total number of frames of VR images that need to be transmitted at a time by the time required for compressing one frame of a VR image. The time required for compressing one frame of a VR image may be obtained through a test. For example, the VR host may record a first moment before one frame of a VR image is compressed, and a second moment at which compression is completed. A difference between the second moment and the first moment is the duration required for compressing one frame of a VR image. The third time period may be obtained by dividing the volume of data transmitted at a time by the transmission rate of a radio channel. The volume of the data transmitted at a time may be determined based on the total number of frames of transmitted VR images and the volume of data included in each frame of a VR image. After the three time periods are determined, the first duration is obtained by adding up the three time periods. Certainly, there may be another way for calculating the first duration, and this is not specifically limited by this embodiment.

The VR host may determine, based on the received motion information and the historical motion information of the VR device, whether the VR device is in a stationary state or in a moving state in the future first duration.

As mentioned above, if the VR device, while sending the motion information, further sends the information about the time for generating the motion information, when receiving the motion information and the information about the time for generating the motion information, the VR host may correspondingly store the motion information and the information about the time, so as to obtain information that the motion information of the VR device changes over time, that is, to obtain the historical motion information of the VR device.

Using a VR game as an example, the historical motion information of the VR device that is stored in the VR host is as follows: in an exemplary embodiment, a rate of the VR device at moment 00:00 is 0, a rate of the VR device at moment 00:05 is 1 m/s, a rate of the VR device at moment 00:10 is 2 m/s, a rate of the VR device at moment 00:15 is 3 m/s, a rate of the VR device at moment 00:20 is 2 m/s, a rate of the VR device at moment 00:25 is 1 m/s, a rate of the VR device at moment 00:30 is 0 m/s, a rate of the VR device at moment 00:35 is 0 m/s, and a rate of the VR device at moment 00:40 is 0 m/s.

Still taking the VR game as an example, the VR host receives, at moment 00:14, motion information and information about a time for generating the motion information that is sent by the VR device, and a rate of the VR device at moment 00:12 is 2 m/s. If the first duration is 3 s, the VR host may learn, based on the historical motion information of the VR device, that within 3 s in the future, namely, at moment 00:15, a rate of the VR host is 3 m/s. Therefore, it is determined that the VR device is in a moving state. In another example, the VR host receives, at moment 00:30, the motion information and the information about the time for generating the motion information that is sent by the VR host, and, in an exemplary embodiment, a rate of the VR device at moment 00:28 is 0 m/s. If the first duration is 3 s, the VR host may learn, based on the historical motion information of the VR device, that within 3 s in the future, namely, at moment 00:15, a rate of the VR host is 0 m/s. That is, the VR device is in a stationary state.

The following separately describes the two cases in the implementation process of the third sub-step.

In the first case, when the VR device is in a stationary state in the future first duration, the VR host determines the final image compression ratio.

It should be noted that the channel quality of the radio channel between the VR host and the VR device is related to the motion status of the VR device to some extent. For example, when the VR device moves quickly, stability of the channel is relatively poor, and the channel quality changes greatly. When the VR device is stationary, usually the channel quality is relatively stable and only changes slightly. Therefore, when the VR host determines that the VR device is in a stationary state in the future first duration, it may be determined that the channel quality is relatively stable. In this case, the VR host may directly determine the image compression ratio corresponding to detected channel quality of the radio channel as the final image compression ratio, that is, directly use the preliminarily determined image compression ratio as the final image compression ratio.

In the second case, when the VR device is in a moving state in the future first duration, the VR host determines the final image compression ratio.

When the VR device determines that the VR device is in a moving state in the future first duration, the preliminarily determined image compression ratio may be adjusted based on motion information (the motion information herein is used to indicate a current motion status of the VR device, and is not the historical motion information mentioned above). For example, if the motion information indicates that a moving rate of the VR device is relatively low, the VR host appropriately reduces the image compression ratio based on the preliminarily determined image compression ratio. If the motion information indicates that the moving rate of the VR device is relatively high, the VR host appropriately increases the image compression ratio based on the preliminarily determined image compression ratio.

This is because when the moving rate of the VR device is relatively high, a switching rate of a VR image displayed by the VR device is relatively high, and content changes quickly. For a fast moving image, a user tends to ignore quality of an image, but pays attention to coherence and fluency of the image. Therefore, the coherence of the image may be ensured by increasing the image compression ratio, and then user experience is improved. However, when the moving rate of the VR device is relatively low, the content of the VR image displayed by the VR device changes slowly. For a slow moving image or a static image, a user often more closely scrutinizes the quality of the image, such as the clarity and resolution of the image. In this case, the quality of the image may be improved by reducing the image compression ratio, and user experience is improved.

For the second case, to improve accuracy of determining the image compression ratio, the VR host may consider a change trend of the channel quality of the radio channel in the future first duration when adjusting the preliminarily determined image compression ratio based on the motion information. Therefore, the VR host may adjust the preliminarily determined image compression ratio based on the motion information and the predicted change trend of the channel quality in the future first duration. Details are as follows:

If the motion information indicates that the moving rate of the VR device is relatively low, and the channel quality in the future first duration is improved, the VR host appropriately reduces the image compression ratio based on the preliminarily determined image compression ratio. If the motion information indicates that the moving rate of the VR device is relatively high, and the channel quality in the future first duration is reduced, the VR host appropriately increases the image compression ratio based on the preliminarily determined image compression ratio.

This is because when the moving rate of the VR device is relatively high, the content of the VR image displayed by the VR device changes quickly. To ensure fluency of the VR image, the VR host increases the image compression ratio based on the preliminarily determined image compression ratio. However, after the image compression ratio is increased, the volume of transmitted data is greatly reduced. In this case, the transmission requirement can be met without good channel quality. Therefore, if the channel quality is reduced, transmission of the VR image is not affected. When the moving rate of the VR device is relatively low, the content of the VR image displayed by the VR device changes slowly. To ensure quality of the VR image, the VR host reduces the image compression ratio based on the preliminarily determined image compression ratio. However, after the image compression ratio is reduced, the volume of transmitted data may be greatly increased. If the channel quality of the radio channel is improved, transmission of the increased volume of data is not affected. That is, the VR host adjusts the image compression ratio based on the motion information and the change trend of the channel quality in the future first duration, so that accuracy of determining the image compression ratio can be further improved.

The VR host may adjust the image compression ratio based only on the motion information, or may adjust the image compression ratio based on the motion information and the change trend of the channel quality of the radio channel in the future first duration.

Still referring to exemplary FIG. 2, in step S204 the VR host compresses a to-be-sent VR image based on the image compression ratio.

In this exemplary embodiment, the VR host may compress each frame of a VR image based on the determined final image compression ratio, or may package and compress a number of frames of VR images together every time.

In this exemplary embodiment, the VR host determines the image compression ratio based on the motion information of the VR device. For example, when the moving rate of the VR device is relatively low, that is, when the content of the VR image displayed by the VR device changes slowly, a relatively small image compression ratio is determined to ensure quality of the VR image. When the moving rate of the VR device is relatively high, that is, the content of the VR image displayed by the VR device changes quickly, a relatively large image compression ratio is determined to ensure coherence of the VR image. In this manner, accuracy of the determined image compression ratio is improved, and a user standard of quality can be better met.

In an exemplary operation process, before sending the VR image, the VR host needs to determine a MCS, and then performs modulation and coding on the VR image according to the MCS. The following describes how an exemplary VR system determines the MCS.

The VR host determines the MCS based on the channel quality of the radio channel. For example, if the channel quality of the radio channel is relatively high, a MCS with a relatively high modulation and coding rate is determined. However, the MCS determined in this manner is inaccurate. This is because in practice each MCS is corresponding to its own modulation and coding rate, and the modulation and coding rate is related to a frame error rate generated in a transmission process of the VR image. For example, when the modulation and coding rate is relatively high, although transmission efficiency is relatively high, a probability of occurrence of a frame error or a frame loss is relatively high. If the moving rate of the VR device is relatively high, the content of the VR image displayed by the VR device changes quickly. To ensure fluency of the VR image, the probability of a frame error or a frame loss needs to be reduced, and therefore, an MCS with a very high modulation and coding rate is not applicable. If the channel quality of the radio channel is always good, and the VR host always uses an MCS with a relatively high modulation and coding rate, the probability of occurrence of a frame loss and a frame error is very high. Once a frame loss occurs, a VR image viewed by a user is not coherent. It can be understood by a person of ordinary skill in the art that currently, in a typical VR system, the MCS determined by the VR host based on the channel quality is inaccurate. The following describes a process of determining the MCS.

In step S205, the VR host determines the MCS based on the motion information.

An execution sequence between S205 and S203 or S204 is not limited, provided that S205 occurs after S202. FIG. 2 is merely an example in which S205 occurs after S204.

Similar to S203, a possible implementation of S205 is as follows: The VR host preliminarily determines a MCS based on the channel quality of the radio channel first, and then determines a final MCS based on the motion information and the preliminarily determined MCS. In this manner, two different factors, namely, the channel quality and the motion information, are comprehensively considered, so that the determined MCS is more accurate. The following describes in detail an implementation process of this manner.

The VR host may determine the final MCS in three sub-steps. In the first sub-step, the radio channel between the VR host and the VR device is determined. In the second sub-step, an MCS is preliminarily determined based on the channel quality of the radio channel; and in the third step, a final MCS is determined based on the motion information and the preliminarily determined MCS.

For an implementation process of the first sub-step, refer to the description about the first sub-step of step S203. For brevity, details are not described herein again.

In an implementation process of the second sub-step, the VR host first needs to determine the channel quality and a mapping relationship between channel quality and an MCS. The mapping relationship between channel quality and an MCS may be pre-stored by the VR host. Therefore, the VR host mainly needs to determine the channel quality. The manner of determining the channel quality by the VR host has been described above. Then, the VR host preliminarily determines an MCS based on the stored mapping relationship between channel quality and an MCS. There are a number of types of mapping relationships between channel quality of a radio channel and an MCS. Table 2 is an example. In addition, Table 2 is merely an example of the mapping relationship between channel quality and a MCS, and is not a limitation on the mapping relationship between channel quality and a MCS. In Table 1, a transmission rate of the radio channel is used as an example to show the channel quality of the radio channel.

TABLE 2

| Transmission rate of a radio channel (gigabits per second) | MCS | Modulation and coding rate |
|---|---|---|
| 2 Gbps | BPSK | 300 |
| 3 Gbps | QPSK | 400 |
| 4 Gbps | 16-QAM | 600 |
| 5 Gbps | 64-QAM | 700 |

In an exemplary embodiment, the mapping relationship between channel quality of a radio channel and a MCS may use an MCS index table in the prior art, or may be a mapping relationship defined by a user.

For example, if a transmission rate, determined by the VR host, of the radio channel is 4 Gbps (gigabits per second), it can be preliminarily determined based on Table 2 that the MCS is 16-QAM.

The following describes an implementation process of the third sub-step, where the VR host determines the final MCS based on the motion information and the preliminarily determined MCS. Similar to step S203, the VR host predicts the motion status of the VR device in the future first duration based on the received motion information and then determines the final MCS based on the motion status and the preliminarily determined MCS. Therefore, the implementation process of the third sub-step is also divided into two cases. In the first case, when the VR device is in a stationary state in the future first duration, the VR host determines the final MCS. In the second case, when the VR device is in a moving state in the future first duration, the VR host determines the final MCS. The reason why the VR host predicts the motion status of the VR device in the future first duration and the implementation are described above, and are not described herein again. Therefore, the following directly describes the two cases of the implementation process of the second step.

In the first case, when the VR device is in a stationary state in the future first duration, the VR host determines the final MCS.

As mentioned above, the channel quality of the radio channel between the VR host and the VR device is related to the motion status of the VR device to some extent. When the VR host determines that the VR device is in a stationary state in the future first duration, it may be determined that the channel quality is relatively stable. In this case, the VR host may directly determine the MCS corresponding to the detected channel quality of the radio channel as the final MCS.

In the second case, when the VR device is in a moving state in the future first duration, the VR host determines the final MCS.

When the VR device determines that the VR device is in a moving state in the future first duration, the VR host may adjust the preliminarily determined MCS based on the motion information. For example, if the motion information indicates that the moving rate of the VR device is relatively low, the VR host adjusts the preliminarily determined MCS to a first MCS, where a modulation and coding rate of the first MCS is greater than or equal to a modulation and coding rate of the preliminarily determined MCS. If the motion information indicates that the moving rate of the VR device is relatively high, the VR host adjusts the preliminarily determined MCS to a second MCS, where a modulation and coding rate of the second MCS is less than the modulation and coding rate of the preliminarily determined MCS.

This is because when the moving rate of the VR device is relatively high, that is, the content of the VR image displayed by the VR device changes quickly, a quantity of frames of VR images transmitted each time is relatively large. To ensure coherence and fluency of the VR image, reduce the probability of occurrence of a frame error or a frame loss, and avoid image retransmission, the VR host may determine a MCS with a relatively low modulation and coding rate. When the moving rate of the VR device is relatively low, the content of the VR image displayed by the VR device changes slowly, content of the VR image transmitted each time changes little, and a quantity of frames of VR images that need to be transmitted each time is relatively small. In this case, a MCS with a very low modulation and coding rate is not needed. Therefore, the VR host may determine a MCS with a relatively high modulation and coding rate, and then transmission efficiency is improved. Alternatively, when the moving rate of the VR device is relatively low, the radio channel also changes slowly, and the detected channel quality is relatively accurate. Therefore, the VR host may directly determine the MCS corresponding to the detected channel quality as the final MCS.

In step S206, the VR host performs modulation and coding on the compressed VR image according to the MCS.

if the VR host compresses each frame of a VR image, the VR host may perform modulation and coding on each frame of a compressed VR image according to the final MCS. If the VR host packages and compresses a number of frames of VR images together, the VR host may perform modulation and coding on a compressed package of the VR image according to the final MCS.

In step S207, the VR host sends the compressed VR image on which modulation and coding has been performed to the VR device, and correspondingly, the VR device receives the VR image on which modulation and coding has been performed.

After receiving the compressed VR image on which modulation and coding has been performed, the VR device performs demodulation and decoding on the VR image to obtain the compressed VR image, decompresses the compressed VR image, and finally displays the VR image.

the VR host determines the MCS based on the motion information of the VR device. For example, when the moving rate of the VR device is relatively high, the switching rate of the VR image displayed by the VR device is relatively high. To ensure coherence and fluency of the VR image, reduce a probability of occurrence of a frame error or a frame loss, and avoid image retransmission, the VR host may determine a MCS with a relatively low modulation and coding rate. When the moving rate of the VR device is relatively low, that is, a quantity of frames of VR images transmitted each time is relatively small, the VR host may determine a MCS with a relatively high modulation and coding rate or directly determine a MCS based on the channel quality of the radio channel, and then transmission efficiency is improved. In this manner, accuracy of the determined MCS is improved, and a requirement of a user can be better met.

In summary, the VR host determines the image compression ratio and the MCS based on the motion information of the VR device. For example, when the moving rate of the VR device is relatively low, that is, the content of the VR image displayed by the VR device changes slowly, a relatively small image compression ratio is determined at this time, and a MCS may be directly determined based on current channel quality. When the moving rate of the VR device is relatively high, that is, the content of the VR image displayed by the VR device changes quickly, for a flash motion image, a human eye has a lower requirement on image quality. Therefore, a relatively large image compression ratio may be determined at this time to ensure coherence of the VR image. In addition, the VR host determines a MCS with a relatively low modulation and coding rate to doubly ensure the coherence of the VR image. Therefore, in the method for sending a VR image provided, the VR host may determine the image compression ratio and the MCS based on the motion information of the VR device, so as to ensure quality of the VR image, improve transmission efficiency, and better meet a requirement of a user.

The following describes a device, provided, with reference to the accompanying drawings.

Figure 4:
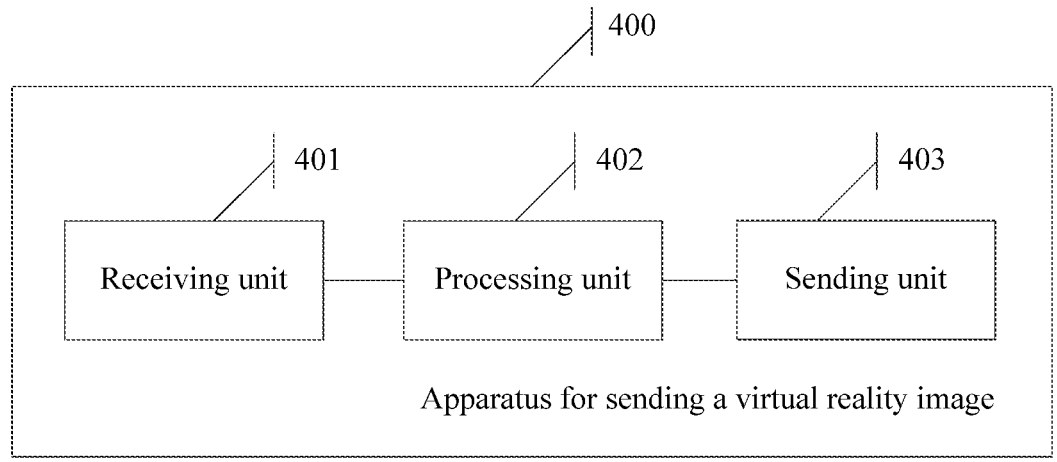
FIG. 4 is a schematic structural diagram of an apparatus for sending a VR image.

FIG. 4 is a schematic structural diagram of an apparatus 400 for sending a VR image. The apparatus 400 for sending a VR image may implement a function of the VR host mentioned above. The apparatus 400 for sending a VR image may include a receiving unit 401, a processing unit 402, and a sending unit 403. The receiving unit 401 may be configured to perform S202 in the embodiment shown in FIG. 2, and/or configured to support another process of the technology described herein. The processing unit 402 may be configured to perform S203 to S206 in the embodiment shown in FIG. 2, and/or configured to support another process of the technology described herein. The sending unit 403 may be configured to perform S207 in the embodiment shown in FIG. 2, and/or configured to support another process of the technology described herein. All related content of steps in the foregoing method embodiments may be cited in function descriptions of corresponding function modules. Details are not described herein again.

It should be noted that, the apparatus for sending a VR image is displayed in a form of a functional unit. Without limitation, the term "unit" as used herein may refer to an application-specific integrated circuit (ASIC), an electronic circuit, a (shared, dedicated, or packet) processor, and a memory that execute one or more software or firmware programs, a combined logic circuit, and/or another suitable component that provides the function.

Figure 5:
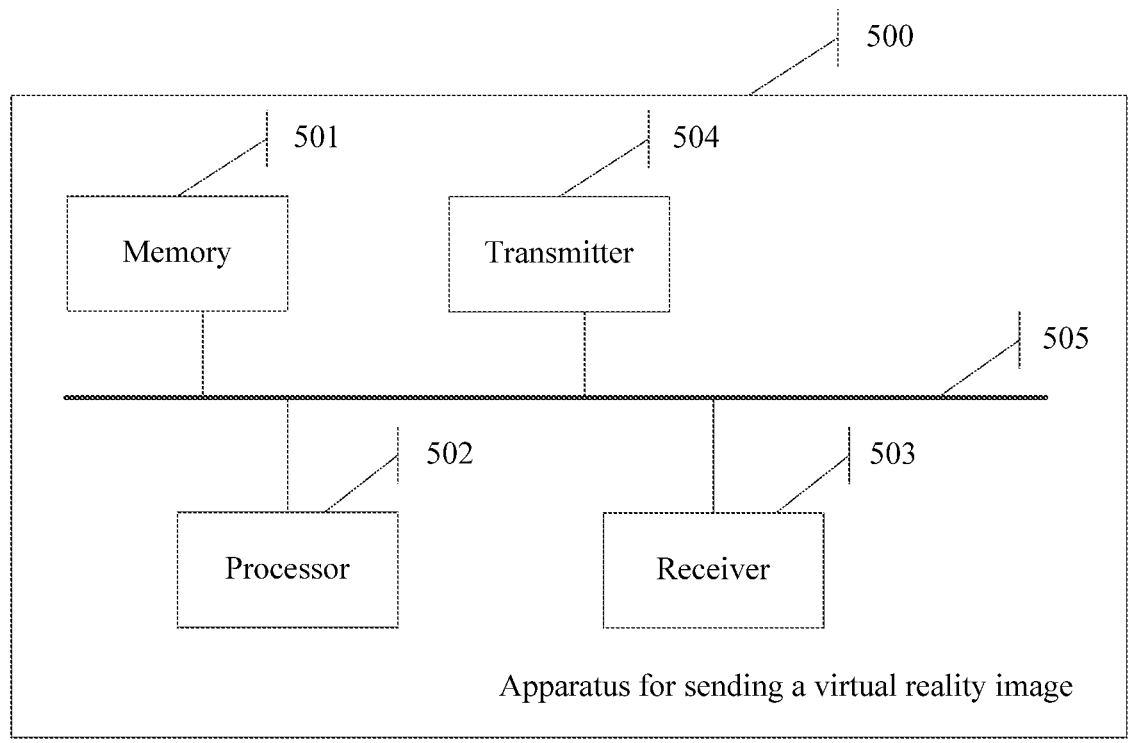
FIG. 5 is a schematic structural diagram of another apparatus for sending a VR image.

In a simple embodiment, a person skilled in the art may figure out that the apparatus 400 for sending a VR image may be further implemented by using a structure shown in FIG. 5.

As shown in FIG. 5, an apparatus 500 for sending a VR image may include a memory 501, a processor 502, a receiver 503, a transmitter 504, and a bus 505. The memory 501, the processor 502, the receiver 503, and the transmitter 504 may be connected by using the bus 505. The receiver 503 is configured to receive first motion information sent by a VR device, where the first motion information is used to indicate a current motion status of the VR device. The processor 502 is configured to determine a first image compression ratio based on the first motion information, and compress a to-be-sent VR image based on the first image compression ratio. The transmitter 504 is configured to send the compressed VR image to the VR device. For an exemplary implementation of operations performed by the processor 502, the receiver 503, and the transmitter 504, refer to corresponding steps performed by the VR host in the embodiment of FIG. 2. Details are not described again.

The memory 501 is configured to store a computer executable instruction. When the apparatus 500 for sending a VR image is operating, the processor 502 executes the computer executable instruction stored in the memory 501 to implement the foregoing function, so as to implement the method for sending a VR image provided in the embodiment shown in FIG. 2. For an exemplary image shooting method, refer to related descriptions in the foregoing and the accompanying drawings. Details are not described herein again.

The processor 502 may be a field-programmable gate array (FPGA), an ASIC, a system on chip (SoC), a central processor unit (CPU), a network processor, a digital signal processor (DSP), a micro controller unit (MCU), a programmable logic device (PLD), or another integrated chip. The bus 505 may be a peripheral component interconnect (PCI) bus, an extended industry standard architecture (EISA) bus, or the like. The bus 505 may be classified into an address bus, a data bus, a control bus, and the like. For ease of representation, only one thick line is used to represent the bus in FIG. 5, but this does not mean that there is only one bus or only one type of bus.

All or some of the foregoing embodiments of the foregoing present invention may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), and or the like. The foregoing descriptions are merely specific implementations of this application, but are not intended to limit the protection scope of this application. Any variation or replacement readily figured out by a person skilled in the art within the technical scope disclosed shall fall within the protection scope of this application.

What is claimed is:

1. A method for sending a virtual reality (VR) image, comprising:
   detecting, by the VR host, a channel quality of a radio channel, wherein the radio channel is a communication channel between the VR device and the VR host;
   determining, by the VR host based on a mapping relationship between channel quality of a radio channel and a modulation and coding scheme, a modulation and coding scheme corresponding to the detected channel quality;
   receiving, by a VR host, first motion information from a VR device, wherein the first motion information indicates a current motion status of the VR device;
   determining, by the VR host, a first image compression ratio from a plurality of potential image compression ratios including a first ratio and a second ratio larger than the first ratio, based on a moving rate magnitude of a motion value in the first motion information;

determining, by the VR host based on the first motion information, the modulation and coding scheme corresponding to the detected channel quality as a first modulation and coding scheme; or adjusting, by the VR host based on the first motion information, the modulation and coding scheme corresponding to the detected channel quality, and using an adjusted modulation and coding scheme as a first modulation and coding scheme;

compressing, by the VR host, a to-be-sent VR image based on the first image compression ratio;

performing, by the VR host, modulation and coding on the compressed VR image according to the first modulation and coding scheme; and sending, by the VR host, the compressed VR image on which modulation and coding has been performed to the VR device.

2. The method according to claim 1, the method further comprising:

determining, by the VR host based on a relationship between the channel quality of the radio channel and an image compression ratio, an image compression ratio corresponding to the detected channel quality; and wherein the determining, by the VR host, of a first image compression ratio based on the first motion information comprises:

determining, by the VR host based on the first motion information, the image compression ratio corresponding to the detected channel quality as the first image compression ratio; or adjusting, by the VR host based on the first motion information, the image compression ratio corresponding to the detected channel quality, and using an adjusted image compression ratio as the first image compression ratio.

3. The method according to claim 2, wherein the determining, by the VR host based on the first motion information, of the image compression ratio corresponding to the detected channel quality as the first image compression ratio comprises:

determining, by the VR host, the image compression ratio corresponding to the detected channel quality as the first image compression ratio if it is determined, based on the first motion information and historical motion information of the VR device, that the VR device is in a stationary state in future first duration.

4. The method according to claim 2, wherein the adjusting, by the VR host based on the first motion information, of the image compression ratio corresponding to the detected channel quality comprises:

adjusting, by the VR host based on the first motion information, the image compression ratio corresponding to the detected channel quality if it is determined, based on the first motion information and historical motion information of the VR device, that the VR device is in a moving state in future first duration.

5. The method according to claim 2, wherein the adjusting, by the VR host based on the first motion information, of the image compression ratio corresponding to the detected channel quality comprises:

reducing, by the VR host, the image compression ratio corresponding to the detected channel quality if the first motion information is used to indicate that a moving rate of the VR device is less than or equal to a first rate; or increasing, by the VR host, the image compression ratio corresponding to the detected channel quality if the first motion information is used to indicate that a moving rate of the VR device is greater than a second rate; wherein the first rate is less than or equal to the second rate.

6. The method according to claim 1, wherein the determining, by the VR host based on the first motion information, of the modulation and coding scheme corresponding to the detected channel quality as a first modulation and coding scheme comprises:

determining, by the VR host, the modulation and coding scheme corresponding to the detected channel quality as the first modulation and coding scheme if determining, based on the first motion information and the historical motion information of the VR device, that the VR device is in a stationary state in the future first duration.

7. The method according to claim 1, wherein the adjusting, by the VR host based on the first motion information, of the modulation and coding scheme corresponding to the detected channel quality comprises:

adjusting, by the VR host based on the first motion information, the modulation and coding scheme corresponding to the detected channel quality if determining, based on the first motion information and the historical motion information of the VR device, that the VR device is in a moving state in the future first duration.

8. The method according to claim 7, wherein the adjusting, by the VR host based on the first motion information, of the modulation and coding scheme corresponding to the detected channel quality comprises:

adjusting, by the VR host, the modulation and coding scheme corresponding to the detected channel quality to a second modulation and coding scheme if the first motion information is used to indicate that the moving rate of the VR device is less than or equal to a first rate, wherein a modulation and coding rate of the second modulation and coding scheme is greater than a modulation and coding rate of the modulation and coding scheme corresponding to the detected channel quality; or adjusting, by the VR host, the modulation and coding scheme corresponding to the detected channel quality to a third modulation and coding scheme if the first motion information is used to indicate that the moving rate of the VR device is greater than a second rate, wherein a modulation and coding rate of the third modulation and coding scheme is less than a modulation and coding rate of the modulation and coding scheme corresponding to the detected channel quality; wherein the first rate is less than the second rate.

9. A non-transitory computer-readable storage medium, comprising an instruction, wherein when the instruction runs on a computer, the computer is configured to:

detect a channel quality of a radio channel by the VR host, wherein the radio channel is a communication channel between the VR device and the VR host;

determine a modulation and coding scheme corresponding to the detected channel quality by the VR host, based on a mapping relationship between channel quality of a radio channel and a modulation and coding scheme;

receive first motion information sent by a VR device, wherein the first motion information is used to indicate a current motion status of the VR device;

determine a first image compression ratio from a plurality of potential image compression ratios including a first ratio and a second ratio larger than the first ratio, based on a moving rate magnitude of a motion value in the first motion information;

determine the modulation and coding scheme corresponding to the detected channel quality as a first modulation and coding scheme by the VR host, based on the first motion information; or adjust the modulation and coding scheme corresponding to the detected channel quality by the VR host based on the first motion information, and use an adjusted modulation and coding scheme as a first modulation and coding scheme;

compress a to-be-sent VR image based on the first image compression ratio;

perform modulation and coding on the compressed VR image according to the first modulation and coding scheme by the VR host; and send the compressed VR image on which modulation and coding has been performed to the VR device by the VR host.

10. A virtual reality (VR) host device, comprising:
a receiver, configured to receive first motion information sent by a VR device, wherein the first motion information is used to indicate a current motion status of the VR device;
a processor, configured to detect current channel quality of a radio channel, wherein the radio channel is a communication channel between the VR device and the VR host;
determine, based on a mapping relationship between channel quality of a radio channel and a modulation and coding scheme, a modulation and coding scheme corresponding to the detected channel quality;
determine a first image compression ratio from a plurality of potential image compression ratios including a first ratio and a second ratio larger than the first ratio, based on a moving rate magnitude of a motion value in the first motion information and compress a to-be-sent VR image based on the first image compression ratio;
determine, based on the first motion information, the modulation and coding scheme corresponding to the detected channel quality as a first modulation and coding scheme; or adjusting, by the VR host based on the first motion information, the modulation and coding scheme corresponding to the detected channel quality, and using an adjusted modulation and coding scheme as a first modulation and coding scheme; and
perform modulation and coding on the compressed VR image according to the first modulation and coding scheme; and
a transmitter configured to send the compressed VR image to the VR device.

11. The VR host device according to claim 10, wherein the processor is further configured to:
determine, based on a mapping relationship between channel quality of a radio channel and an image compression ratio, an image compression ratio corresponding to the detected channel quality; and
the determining of the first image compression ratio based on the first motion information comprises:
determining, based on the first motion information, the image compression ratio corresponding to the detected channel quality as the first image compression ratio; or adjusting, by the VR host based on the first motion information, the image compression ratio corresponding to the detected channel quality, and using an adjusted image compression ratio as the first image compression ratio.

12. The VR host device according to claim 11, wherein the determining, based on the first motion information, of the image compression ratio corresponding to the detected channel quality as the first image compression ratio comprises:
determining the image compression ratio corresponding to the detected channel quality as the first image compression ratio if determining, based on the first motion information and historical motion information of the VR device, that the VR device is in a stationary state in future first duration.

13. The VR host device according to claim 11, wherein the adjusting, based on the first motion information, of the image compression ratio corresponding to the detected channel quality comprises:
adjusting, based on the first motion information, the image compression ratio corresponding to the detected channel quality if determining, based on the first motion information and historical motion information of the VR device, that the VR device is in a moving state in future first duration.

14. The VR host device according to claim 11, wherein the adjusting, based on the first motion information, of the image compression ratio corresponding to the detected channel quality comprises:
reducing the image compression ratio corresponding to the detected channel quality if the first motion information is used to indicate that a moving rate of the VR device is less than or equal to a first rate; or
increasing the image compression ratio corresponding to the detected channel quality if the first motion information is used to indicate that a moving rate of the VR device is greater than a second rate; wherein
the first rate is less than or equal to the second rate.

15. The VR host device according to claim 11, wherein the first motion information is used to indicate current location information of the VR device, and the detecting current channel quality of a radio channel comprises:
determining within a range of a first angle based on the location information, a first wireless transmission direction from at least one wireless transmission direction that is generated by the VR device and distributed in a 360-degree range, wherein the first angle is greater than 0 degrees and less than 360 degrees; and
detecting current channel quality of a radio channel in the first wireless transmission direction.

16. The VR host device according to claim 10, wherein the determining of the processor, based on the first motion information, of the modulation and coding scheme corresponding to the detected channel quality as a first modulation and coding scheme comprises:
determining, the modulation and coding scheme corresponding to the detected channel quality as the first modulation and coding scheme if determining, based on the first motion information and the historical motion information of the VR device, that the VR device is in a stationary state in the future first duration.

17. The VR host device according to claim 10, wherein the adjusting, based on the first motion information, of the modulation and coding scheme corresponding to the detected channel quality comprises:
adjusting, based on the first motion information, the modulation and coding scheme corresponding to the detected channel quality if determining, based on the first motion information and the historical motion information of the VR device, that the VR device is in a moving state in the future first duration.

18. The VR host device according to claim 17, wherein the adjusting, based on the first motion information, of the modulation and coding scheme corresponding to the detected channel quality comprises:

adjusting the modulation and coding scheme corresponding to the detected channel quality to a second modulation and coding scheme if the first motion information is used to indicate that the moving rate of the VR device is less than or equal to a first rate, wherein a modulation and coding rate of the second modulation and coding scheme is greater than a modulation and coding rate of the modulation and coding scheme corresponding to the detected channel quality; or adjusting the modulation and coding scheme corresponding to the detected channel quality to a third modulation and coding scheme if the first motion information is used to indicate that the moving rate of the VR device is greater than a second rate, wherein a modulation and coding rate of the third modulation and coding scheme is less than a modulation and coding rate of the modulation and coding scheme corresponding to the detected channel quality; wherein the first rate is less than the second rate.

\* \* \* \* \*